DISPOSABLE URINAL

Original Filed Sept. 1, 1971 2 Sheets-Sheet 1

Inventor
Anton G. Borse
By Kinzer, Dorn & Zickert
Attorneys

DISPOSABLE URINAL

Original Filed Sept. 1, 1971 2 Sheets-Sheet 2

Inventor
Anton G. Borse
By Kuzer, Dorn & Zickert
Attorneys

United States Patent Office

Re. 28,278
Reissued Dec. 17, 1974

28,278
DISPOSABLE URINAL

Anton G. Borse, Hinsdale, Ill., assignor to
Borse Plastic Products Corp., Hinsdale, Ill.

Original No. 3,716,871, dated Feb. 20, 1973, Ser. No. 176,840, Sept. 1, 1971. Application for reissue Sept. 28, 1973, Ser. No. 401,661
Int. Cl. A47k *11/00;* A61g *9/00*
U.S. Cl. 4—110 12 Claims

Matter enclosed in heavy brackets [ ] appears in the original patent but forms no part of this reissue specification; matter printed in italics indicates the additions made by reissue.

ABSTRACT OF THE DISCLOSURE

A disposable urinal made of plastic material which is blow-molded and includes an upstanding body with a neck portion at the upper end angularly related to the body and a handle portion integrally molded with the neck portion open at one end to facilitate hanging on a bed rail or the like. A cap that is separately molded is provided for locking relation to the handle and for closing the mouth of the neck selectively to form an odor shield.

This invention relates in general to a urinal, and more particularly to a disposable urinal formed of plastic by a blow molding operation, and still more particularly to a disposable urinal for use by bed-ridden patients in a hospital or the like.

The urinal of the present invention is an improvement over the urinal disclosed in U.S. Pat. No. 3,479,671 primarily in that the handle is closed to prevent urine from entering same and causing an undesirable hygienic problem and further because the cap closing the mouth of the urinal is locked onto the handle and not susceptible of falling off and out of reach of the patient. Moreover, the open handle is formed so that it may be more fully utilized when hanging from a bed rail or the like to improve the hanging stability and prevent accidental dislodgment. Further, the width of the base is narrower to provide more thigh comfort.

The disposable urinal according to the present invention is essentially made from a single blow molding operation of a suitable plastic, such as polyethylene, except for the cap which is separately molded of a plastic, such as polyethylene, and later assembled on the handle of the urinal. The urinal includes an upstanding body essentially square in cross section, with a neck portion at the upper end extending angular to the body and having attached thereto a handle which extends adjacent the body to define an open-ended handle arrangement for facilitating the hooking or otherwise supporting of the urinal onto a bed-rail or the like. The handle, while being essentially hollow, includes a pinched portion adjacent the neck to define at the interior of the neck a splash dome deflector that prevents urine from entering the handle. The cap for closing the mouth of the neck includes a closure portion and an anchoring portion between which is a hinge portion. The anchor portion locks the cap to the pinched portion of the handle thereby preventing accidental dislodgment and separation which would render the cap useless to a bed-ridden patient. The closure portion is formed to facilitate snapping into sealed relation with the mouth of the neck.

It is therefore an object of the present invention to provide a new and improved disposable urinal for bed-ridden patients in hospitals or the like.

It is another object of this invention to provide a disposable urinal of plastic made by a blow molding operation wherein an open-ended hollow handle is integral with the body of the urinal and closed adjacent the body to define a splash deflector and prevent urine from entering the hollow handle.

Another object of this invention is in the provision of a plastic blow molded disposable urinal including a separately formed plastic cap having means for locking it to the handle of the urinal to prevent accidental dislodgment.

Other objects, features and advantages of the invention will be apparent from the following detailed disclosure taken in conjunction with the accompanying sheets of drawings, wherein like reference numerals refer to like parts, in which.

Figure 5:
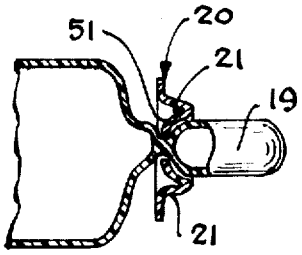
FIG. 5 is a detailed sectional view taken substantially along line 5—5 of FIG. 2.
Figure 1:
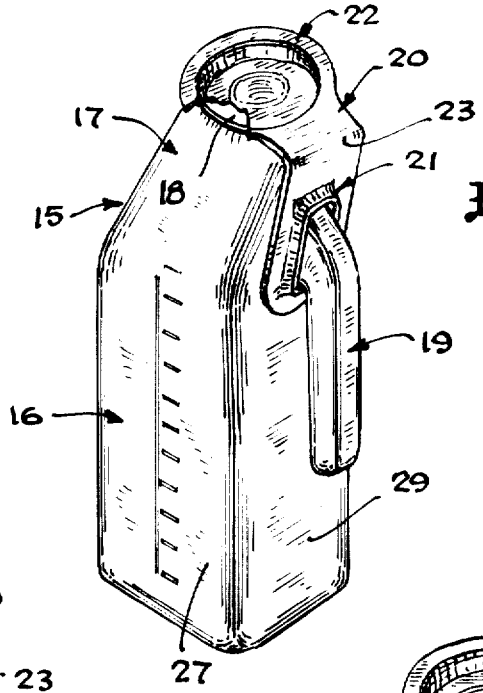
FIG. 1 is a perspective view of the disposable urinal according to the invention, and showing the cap in sealed position.
Figure 2:
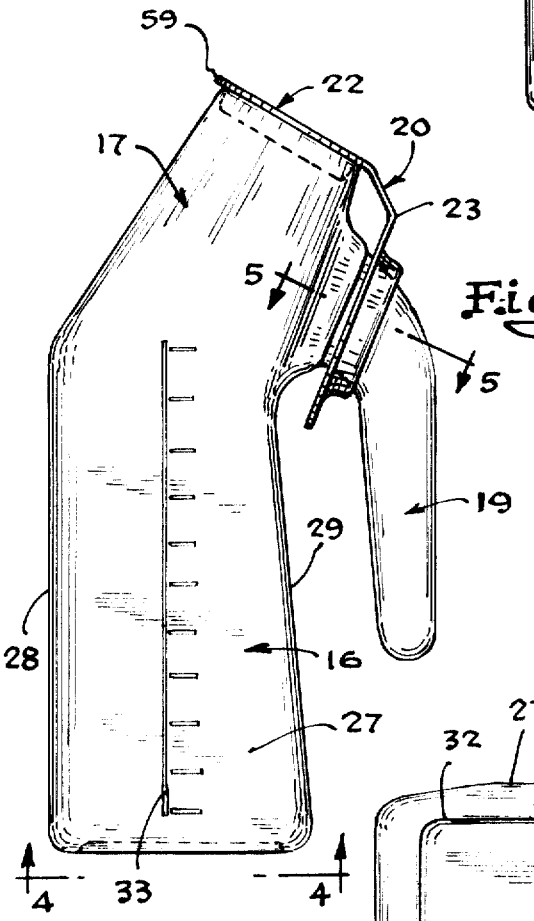
FIG. 2 is a side elevational view of the urinal, the opposite side being identical but of opposite hand.
Figure 3:
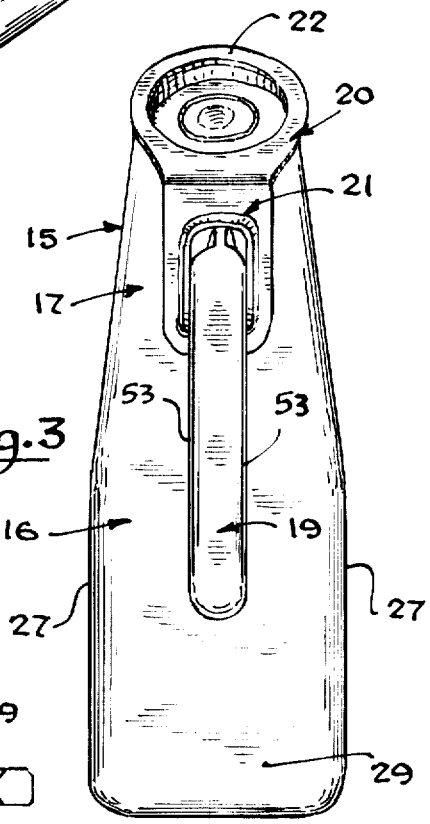
FIG. 3 is a rear elevational view illustrating the manner in which the cap is carried on the handle.

Referring now to the drawings, the disposable urinal 15 of the present invention includes generally a main body 16, a neck 17 extending from the upper part of the body and terminating in a mouth 18, and a handle 19. A cap 20 is lockable onto the handle 19 by means of a locking plate 21 and includes a closure portion 22 hinged to the locking plate at 23 for selectively engaging in and closing the mouth 18 to thereby act as an odor shield.

Both the urinal and cap therefor are made of a suitable plastic material such as polyethylene and of such thin stock as to aid in rendering it inexpensive to produce. As above mentioned, the disposable urinal of the invention is used by bed-ridden patients in hospitals and other similar institutions, it being intended that one urinal be used by a single patient and thereafter disposed of, thereby eliminating sterilization problems and the possible transmittal of infections that may come about by faulty sterilization procedures.

The body 16 includes opposed side walls 27, a front wall 28 and a rear wall 29, all of which stand upright. A bottom wall 31 is slightly depressed centrally to define a circumferential ridge 32 which facilitates the formation of a surface that is capable of sitting squarely on a flat supporting surface for the urinal, and which is especially necessary for a blow molded product. The side walls 27 include measuring graduations 33 for measuring the amount of urine in the urinal, it being appreciated that the polyethylene material is sufficiently translucent so that the level of urine therein can be ascertained when viewing from the outside of the container.

Figure 4:
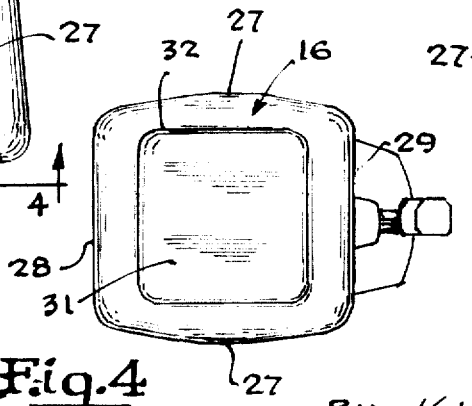
FIG. 4 is a bottom plan view of the urinal.

The front wall 28 is made flat so that it can be set on a horizontal surface if desired, with the handle 19 in the up position and the mouth 18 directed upwardly. As noted particularly in FIG. 4, the cross-sectional geometry of the body 16 is essentially square, thereby reducing the width of the base or bottom wall 31 to render the urinal more comfortable when used between the thighs.

The axis of the neck 17 is angularly related to the longitudinal axis of the body 16 to facilitate usage and especially when the urinal is used in a substantially horizontal position. Further, it can be appreciated that the neck 17 tapers from the body 16 toward the mouth 18 wherein the mouth is sized as a circular opening substantially smaller than the cross section of the body 16.

Figure 6:
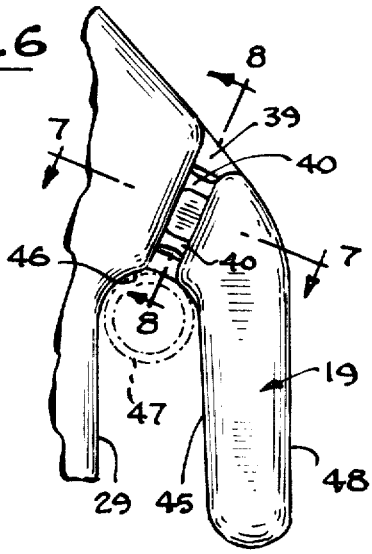
FIG. 6 is a somewhat enlarged, fragmentary view of the handle with the cap removed.
Figure 7:
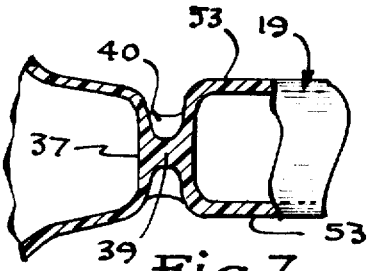
FIG. 7 is an enlarged detail cross-sectional view taken along line 7—7 of FIG. 6.
Figure 8:
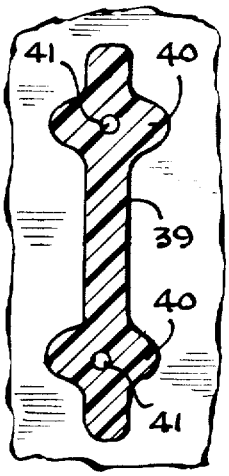
FIG. 8 is an enlarged detailed cross-sectional view taken along line 8—8 of FIG. 6.
Figure 9:
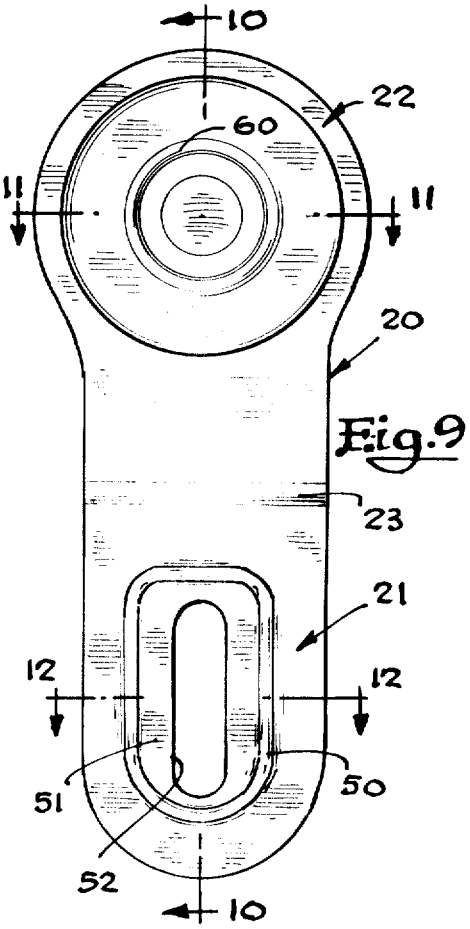
FIG. 9 is a plan view of the cap removed from the urinal.
Figure 10:
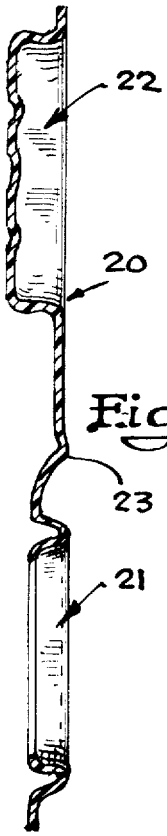
FIG. 10 is a vertical sectional view taken through the cap and substantially along line 10—10 of FIG. 9.

It is an important feature of the present invention to provide the handle 19 in hollow form, FIG. 7, while closing off the interior of the handle to the interior of the urinal to define a splash deflector 37 which prevents urine from splashing into the handle and possibly causing a hygienic problem where a patient is using the urinal for several days. To accomplish closing of the handle during the blow molding operation, the handle is pinched adjacent the neck, as seen more clearly in FIGS. 6 to 8 to define a thickened connecting link 39 with reinforcing ribs 40, the latter of which have pin holes 41 formed therein capable of allowing air to pass into the handle 19 during formation of same in the blow molding process. These pin holes 41 are not of sufficient size to permit any urine to pass therethrough during usage. The link 39 with the reinforcing ribs 40 extending therealong and between the handle and the neck of the urinal define a sturdy connection between the handle and the neck. This also permits the handle to be formed by the inexpensive manner possible in the blow molding process, and provides a handle which is comfortable to grasp by the hand of a user.

The inside wall 45 of the handle 19 extends substantially parallel to the rear wall 29 of the urinal body, and where they merge at their upper ends a full radius corner wall 46 is formed to permit the full open area between the handle and body to be utilized when hanging the urinal on a bed rail or the like, such as shown in phantom and indicated by the numeral 47. Such contributes to greater stability in the hanging of the urinal to prevent accidental dislodgment.

The cap 20 which is suitably molded of a polyethylene of such thin stock as to be readily flexible, selectively tightly closes off and seals the mouth 18 of the urinal, and is locked into place on the handle by the coaction of the locking plate 21 with the pinched portion of the handle defined at the connecting link 39. In this connection, the locking plate includes a continuous somewhat ring-shaped reinforcing rib 50 within which is located a flexible gripper or flexible gripping flange 51 having a centrally located oblong opening 52. The longitudinal dimension of the opening is greater than the dimension between the inside wall 45 and outside wall 48 of the handle 19, while the width of the opening 52 is less than the dimension between the opposite sides 53 of the handle 19. Accordingly, when applying the cap to the urinal, the opening 52 of the locking plate is aligned with the end of the handle 19, and as the locking plate is pushed up onto the handle, flexing of the flexible gripper 51 is experienced to increase the size of the opening 52. When the flexible gripper 51 reaches the area of the pinched portion of the handle at the connecting link 39, the gripper springs back to its normal position, as seen particularly in FIG. 5, to lock the locking plate and cap in place and prevent accidental dislodgment and separation of the cap and urinal when the closure portion 22 is removed from the mouth.

Figure 11:
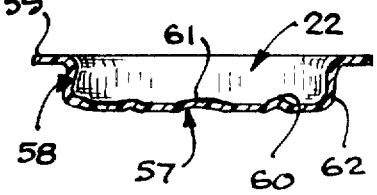
FIG. 11 is a cross-sectional view taken substantially along line 11—11 of FIG. 9.
Figure 12:
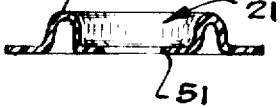
FIG. 12 is a cross-sectional view taken substantially along line 12—12 of FIG. 9.

The closure portion 22 is somewhat cup-shaped in cross section, as seen in FIG. 11, wherein it includes a bottom wall 57, an annular upstanding wall 58, and a lip 59. The bottom wall includes a stiffening ridge 60 which is circular in form and a centrally located bottom 61 that facilitates the insertion of the closure portion into the mouth of the urinal. An annular outwardly projecting sealing portion 62 is formed on the upstanding wall 58, having an outer diameter slightly larger than the inside diameter of the mouth 18 so that upon insertion of the closure portion 22 into the mouth, a slight contraction of the closure member is experienced in order to obtain a tight sealing arrangement between the closure member and the mouth. When inserting the closure portion into the mouth, a finger or thumb can be pressed against the bottom 61 to facilitate insertion. When removing the closure portion from the mouth, the lip 59 may be grasped to facilitate ease in removal. When the closure portion is away from the mouth, it will be appreciated that the locking plate 21 maintains the cap on the urinal in readiness for further use when desired.

It will be understood that modifications and variations may be effected without departing from the scope of the novel concepts of the present invention, but it is understood that this application is to be limited only by the scope of the appended claims.

The invention is hereby claimed as follows:

1. A plastic blow-molded disposable urinal comprising an elongated hollow body substantially square in cross section, a neck extending from the body tapering to a mouth substantially circular in cross section, the axis of the neck extending angular to the axis of the body, an elongated hollow handle integral with the neck extending substantially parallel to the body and defining an open-ended handle to permit hooking the urinal onto a rail or the like, the connection between the handle and the neck forming a radial wall facing the open end of the handle, said handle being pinched and closed at the neck to define a splash deflector within the neck for preventing urine from entering the handle, said pinched portion of the handle including a connecting link between the neck and handle of a thickness substantially less than the thickness of the handle, stiffening rib means on the connecting link between the handle and neck, tiny air hole means in said stiffening rib means to permit air to enter the handle during molding thereof, said hole means being too small to permit urine to pass therethrough, and a cap including a locking plate coacting with the pinched portion of the handle and a closure portion for snap fit into the mouth.

2. The combination of claim 1, wherein said locking plate includes a flexible gripping flange having an opening therethrough with a width less than that of said handle to grip at the pinched portion and lock the cap on the urinal, and a stiffening ridge surrounding the gripping flange.

3. The combination of claim 2, wherein said closure portion includes a cup-shaped portion with an annular sealing ridge having a diameter slightly larger than the diameter of the mouth to provide a tight seal when in place.

4. The combination of claim 3, wherein the closure portion includes a lifting lip surrounding the cup-shaped portion stopping the insertion of the cup into the mouth and defining a hand engaging portion for facilitating removal of the closure portion from the mouth.

5. The combination of claim 4, wherein the center of the shaped portion includes a dome-shaped button to facilitate proper seating of the closure portion in the mouth.

6. The combination of claim 5, wherein the stock thickness of the cap is less than that of the body and neck.

7. The combination of claim 6, wherein the urinal is made of polyethylene.

8. The combination of claim 7, wherein the polyethylene is translucent, and measuring graduations are provided on the side walls of the body to measure the liquid level therein.

*9. A plastic blow-molded disposable urinal comprising an elongated hollow body substantially square in cross section, a neck extending from the body tapering to a mouth substantially circular in cross section, the axis of the neck extending angular to the axis of the body, an*

*elongated hollow handle integral with the neck extending substantially parallel to the body and defining an open-ended handle to permit hooking the urinal onto a rail or the like, the connection between the handle and the neck forming a radial wall facing the open end of the handle, said handle being pinched and closed at the neck to define a splash deflector within the neck for preventing urine from entering the handle, said pinched portion of the handle defining a connecting link between the neck and handle of a thickness substantially less than the thickness of the handle, a cap including a locking plate coacting with the pinched portion of the handle and a closure portion for snap fit into the mouth, and said locking plate including a flexible gripping flange having an opening therethrough with a width less than that of said handle to grip at the pinched portion and lock the cap onto the urinal.*

*10. The combination of claim 9, wherein said locking plate includes a stiffening rib around said gripping flange.*

*11. The combination of claim 10, wherein the stock thickness of the cap is less than that of the body and neck.*

*12. The combination of claim 11, wherein the body is translucent, and measuring graduations are provided*

*on the side walls of the body to measure the liquid level therein.*

References Cited

The following references, cited by the Examiner, are of record in the patented file of this patent or the original patent.

UNITED STATES PATENTS

| | | | |
|---|---|---|---|
| 241,863 | 5/1881 | Hopkins | 4—110 |
| 805,312 | 11/1905 | Meinecke | 4—110 |
| 2,582,398 | 1/1952 | Siegenthal | 4—110 |
| 2,815,511 | 12/1957 | Friedman et al. | 4—110 |
| 3,232,495 | 2/1966 | Schneider | 220—94 A |
| 3,244,148 | 4/1966 | Long | 220—94 A X |
| 3,373,897 | 3/1968 | Haines | 220—94 A X |
| 3,422,463 | 1/1969 | Lowry | 4—110 |
| 3,471,869 | 10/1969 | Segal | 4—110 |
| 3,524,488 | 8/1970 | Scholle | 215—1 C X |
| 3,479,671 | 11/1969 | Beich | 4—110 |

HENRY K. ARTIS, Primary Examiner

U.S. Cl. X.R.

220—94 A